United States Patent [19]
DiMatteo

[11] 3,940,597
[45] Feb. 24, 1976

[54] NAVIGATIONAL ERROR CORRECTING SYSTEM

[75] Inventor: Paul L. DiMatteo, Huntington, N.Y.

[73] Assignee: Dynell Electronics Corporation, Melville, N.Y.

[22] Filed: Dec. 5, 1974

[21] Appl. No.: 529,597

[52] U.S. Cl....... 235/150.2; 235/150.27; 343/112 C
[51] Int. Cl.²......................................... G06F 15/20
[58] Field of Search....... 235/150.2, 150.23, 150.27; 343/112 C, 112 CA, 112 TC

[56] References Cited
UNITED STATES PATENTS

| | | | |
|---|---|---|---|
| 3,103,579 | 9/1963 | Green | 235/150.27 |
| 3,623,090 | 11/1971 | Gilbert et al. | 343/112 CA X |
| 3,668,403 | 6/1972 | Meilander | 235/150.23 |
| 3,721,985 | 3/1973 | Perfitt | 343/112 C X |
| 3,774,215 | 11/1973 | Reed | 235/150.27 X |
| 3,808,598 | 4/1974 | Carter | 343/112 TC |
| 3,869,601 | 3/1975 | Metcalf | 235/150.2 |

Primary Examiner—Charles E. Atkinson
Assistant Examiner—Jerry Smith
Attorney, Agent, or Firm—Max Fogiel

[57] ABSTRACT

An arrangement for correcting errors incurred in airborne navigational systems. A ground installation in the form of a radar determines the positions of a multiple number of aircrafts, and communicates the positional information of the aircraft, simultaneously to all aircrafts involved. Each individual aircraft, thereupon, compares the position determined by its own navigational system, with the position communicated from the ground radar. On the basis of the resultant comparison, the navigator of each individual aircraft, is enabled to correct his position and compensate for the error inherent in the airborne navigational system.

22 Claims, 2 Drawing Figures

NAVIGATIONAL ERROR CORRECTING SYSTEM

BACKGROUND OF THE INVENTION

In the use of airborne navigational systems to indicate to aircraft personnel, their own position with respect to the ground, errors inherent in the sensors of the navigational system and the computations must be taken into account.

Thus, navigational sensors which are self-contained and independent of linkages or communication with ground personnel or installations, provide data which has predetermined uncertainty associated with it. In processing the data obtained from the navigational sensors, further uncertainty in the results may be introduced, by the subsequent computation for the position of the airborne vehicle. The computation, for example, may involve various assumptions, for the purpose of simplifying the computations to obtain the aircraft position from the data supplied by the sensors. Additional computational error may be introduced, if the computation is carried out by, for example, an analog computer. Depending on the number of decimal places or significant figures used in the computation, errors may be incurred even if the computation is performed by a digital computer. The sensors used for deriving the position of the aircraft may be in the form of, for example, inertial, stellar, doppler, radar, and systems which measure wind speed and air speed, or combinations thereof. In the use of such navigational sensing arrangements, dead-reckoning procedures are required and the resultant positional information has inherent error or uncertainty associated with it, in view of the errors or uncertainties prevailing with respect to the sensors and the dead-reckoning procedures.

Accordingly, it is an object of the present invention to provide a navigational error correcting system, which corrects the position of an aircraft, derived from an airborne navigational system.

Another object of the present invention is to provide a navigational error correcting system for use in conjunction with multiple aircraft, without requiring that each aircraft be addressed individually.

A further object of the present invention is to provide a navigational error correcting system of the foregoing character, which operates in conjunction with a ground-based installation for determining the position of an individual aircraft.

A still further object of the present invention is to provide a navigational error correcting system, as described, which is highly reliable in operation, and which is secured for use in defense applications as well as for peacetime use.

SUMMARY OF THE INVENTION

The objects of the present invention are achieved by providing an arrangement in which a ground-based radar follows or tracks a multiple number of aircrafts, and determines the ground position of each individual aircraft or airborne vehicle. The resultant positional information determined by the radar installation, is communicated simultaneously to all aircrafts which are involved. The navigator in each aircraft compares all of the different positions communicated or transmitted by the radar, with his own position determined by his own airborne navigational system. If the error of the airborne navigational system is less than half the distance to the nearest aircraft, then the navigator may correct his own positional information, in accordance with the data derived from the ground installation. If, thereupon, the navigator finds that the difference D between the compared positions is less than the error E of his airborne navigational system, for only one of the communicated positions, then the navigator can correct his position in an unambiguous manner, in accordance with the position communicated from the ground installation. If, on the other hand, the quantity D is not less than E for any position, than the position with the smallest difference may be selected by the navigator, but with less confidence than in the first instance. Should D be less than E for several positions, than the position communicated from the ground installation is ambiguous, and the position with the smallest D is not necessarily correct. Under these last conditions, the navigator should not apply any correction in his ground position.

The novel features which are considered as characteristic for the invention are set forth in particular in the appended claims. The invention itself, however, both as to its construction or its method of operation, together with additional objects and advantages thereof, will be best understood from the following description of specific embodiments when read in connection with the accompanying drawings.

DESCRIPTION OF THE PREFERRED EMBODIMENTS

Figure 1:
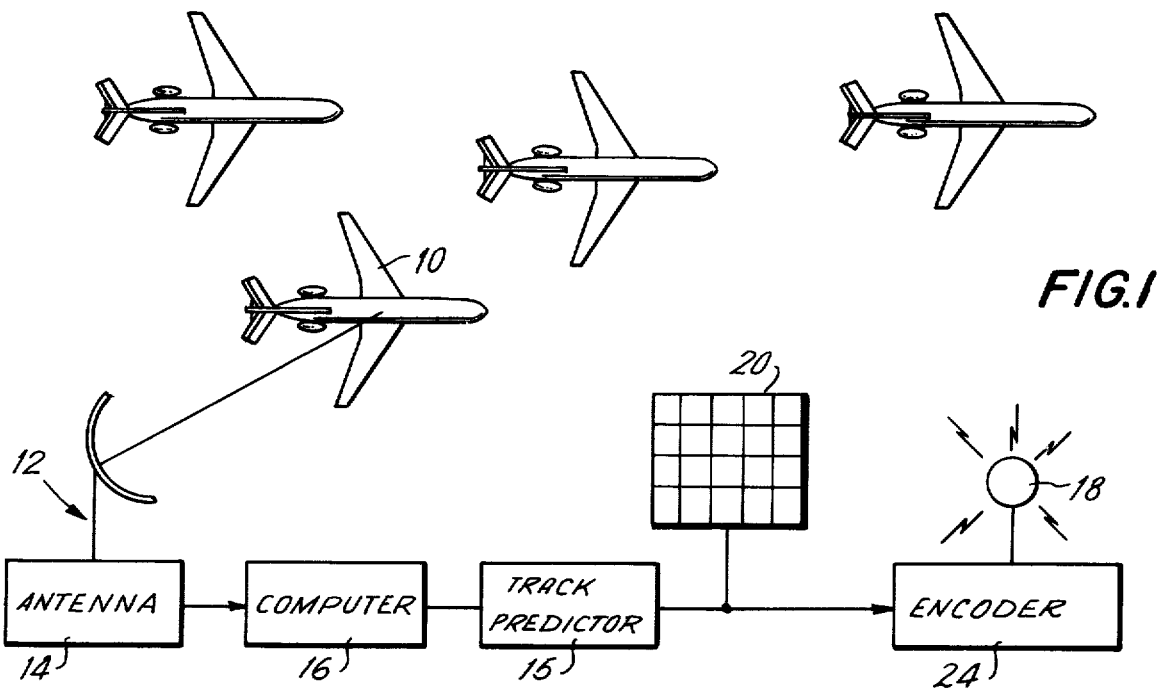
FIG. 1 is a schematic view and shows the navigational error correcting system with a ground-based installation transmitting data to multiple airborne vehicles, in accordance with the present invention.

Referring to the drawing, a plurality or multiple number of airborne vehicles 10 are in communication with a ground-based radar installation, generally indicated by 12. The ground-based installation comprises substantially of an antenna 14 which tracks the individual vehicles or aircrafts in a conventional manner. The positional information derived from the radar antenna 14 is in substantially spherical coordinates involving angles of azimuth, elevation, and range. These coordinates are transmitted to a computer 16 for converting the coordinates derived from the radar into coordinates of longitude and latitude, for example, which are useable by the navigator of the aircraft 10. Other coordinates to be transmitted to the airborne vehicles may also be in the form of, for example, omega, loran, or substantially any one of various grid coordinates useable for this purpose.

The appropriate coordinates derived from the computer 16, are transmitted to the airborne vehicles 10 by means of a transmission antenna 18. At the same time, the positional information derived from the computer 16 may also be displayed on a monitoring display unit 20 used by ground personnel, for example, to monitor the relative positions of the airborne vehicles. The display unit 20, for example, may be situated within the control tower of an airport.

In communicating the positional data tracked by the radar installation 12, the antenna 18 transmits the positional information simultaneously to all airborne vehicles.

Each individual vehicle 10 has, in turn, a receiver 22 for receiving the data derived from the ground-based installation 12. The receiver 22, thereby receives the positional information for all of the airborne vehicles, including his own, since the installation 12 transmits the positional data without addressing each individual aircraft separately.

The communication between the ground and the airborne vehicle may be by voice or any one of the radio links or electromagnetic means. For defense purposes, furthermore, the information can be coded by the computer 16 or a separate encoder 24, so that the transmitted data is secure and can be understood only by the designated or friendly aircraft. The receiver 22 in each individual aircraft, thereby, operates in conjunction with a decoder 26, to decode the information encoded by the ground-based installation 12.

The information received by the unit 22 is applied to a comparator 28. Automatic transmission of the information from the receiver 22 to the comparator 28 may be obtained by interconnecting these two units directly. If, on the other hand, the communication link between the ground and the air is by means of a voice link, then the radio operator aboard the vehicle 10 receives the information by means of earphones 30, for example, and inserts the received information into the comparator 28 by means of a keyboard 32, for example. The airborne system may include both the automatic transmission between units 22 and 28, as well as the manual insertion arrangement 30, 32, in the event of malfunctioning of the automatic system.

The comparator 28 has also applied to it, the positional data derived from the individual airborne navigational system present in the vehicle 10. Assuming, for example, that the positional information as transmitted by the ground installation 12, is in the form of longitude and latitude, then the positional information derived from the individual airborne navigational system 34 present in the aircraft 10 is also transmitted to the comparator 28 in that form of coordinates. Should the coordinates transmitted by the ground installation 12 through the antenna 18 not be consistent with the coordinates derived from the airborne navigational system 34, then computation is required to convert one set of coordinates to the other. Such computation or conversion of coordinates may be carried out by, for example, a computer 36 connected between the airborne navigational system 34 and the comparator 28. This same result may be achieved, of course, if a similar computer were inserted between the receiver 22 and the comparator 28, for example.

The comparator 28 compares the positional data derived from the receiver unit 22, with the positional data obtained from the airborne navigational system 34. For purposes of comparison, the comparator 28 subtracts the data of airborne navigational system 34, from the data obtained from the receiver unit 22. The difference D of these two sets of data is applied in the form of a signal to a correction unit 38. The correction unit 38, in turn, compares the quantity D with the error E inherent in the airborne navigational system 34. Such an error or uncertainty may be determined by systematic test and evaluation of the airborne navigational system 34. Thus, the quantity E representing the error or uncertainty of the values obtained from the system 34, is a predetermined quantity.

Upon evaluation of the quantity D by the correction unit 38, the navigator in each individual aircraft 10 may apply a correction to the positional information derived from the navigational system 34, based on the following conditions:

1. If the quantity D is less than the error E for only one of the positions transmitted by the ground installation 12, then that one position is unambiguous, and the navigator may apply an appropriate correction to the data provided by the system 34.

2. If, on the other hand, the quantity D is not less than the error E for any position, then the position with the smallest difference may be selected. The data from the airborne navigational system 34 may be correspondingly corrected in this case, but with less confidence than under the set of conditions prevailing in the situation (1) above.

3. If the quantity D is less than E for several positions, then there is ambiguity in the position calculated. In this case, the position with the smallest D associated with it, is not necessarily the correct position, and the navigator does not apply a correction to the data from the unit 34.

To compare the various positions transmitted by the ground installation 12 with the position obtained from the airborne navigational system 34, the computer 36 may be used to store the data from the unit 34, so that it may be compared in sequence with the data from the unit 22 by the comparator 28. At the same time, the comparator 28 may include memory components of conventional construction, for the purpose of storing the data from either one or both of the units 22 or 34, so that the various positions received by the unit 22 may be compared sequentially.

The correction applied to the airborne navigational system 34, in view of the evaluation made by the correction unit 38, may be in an automatic manner by connecting the correction unit 38 directly to the unit 34. At the same time, it is possible to manually obtain a read-out from the unit 38, and then apply, in turn, the desired correction to the unit 34 in a manual manner.

If the ground position actually measured by the radar installation 12 is broadcast simultaneously to all of the vehicles 10, then it is necessary to take into account the time delay between the measurement and the broadcasting or comparison actually performed by the individual airborne vehicle. If such time delay is not taken into account, the broadcast position will be in error by the distance travelled between the instant of measurement and the instant of broadcast. A similar error is incurred if there is any time delay associated with receiving and decoding the positional data.

The error associated with the preceding time delays may be avoided by noting the time in conjunction with the measurement taken. Thus, in addition to the positional data broadcast by the ground-based system 12, the time is also broadcast in conjunction with each measurement taken. The airborne navigational system 34 notes, correspondingly, the time associated with the positional data provided by this unit 34, and a meaningful comparison may then be carried out by the comparator unit 28. Thus, the comparator 28 then compares positional data only at the same instants of time.

As noted previously, the coordinate transmitted for positional data by the ground installation 12, may be in the form of latitude and longitude, a grid, position, or omega or loran lines of position, for example. If omega lines of position are transmitted, then the difference or quantity D can be computed separately for each line of position and compared with the corresponding line associated with the error E. This type of comparison can provide less ambiguous results than that obtained from a vector difference between two sets of position in latitude and longitude, for example.

Figure 2:
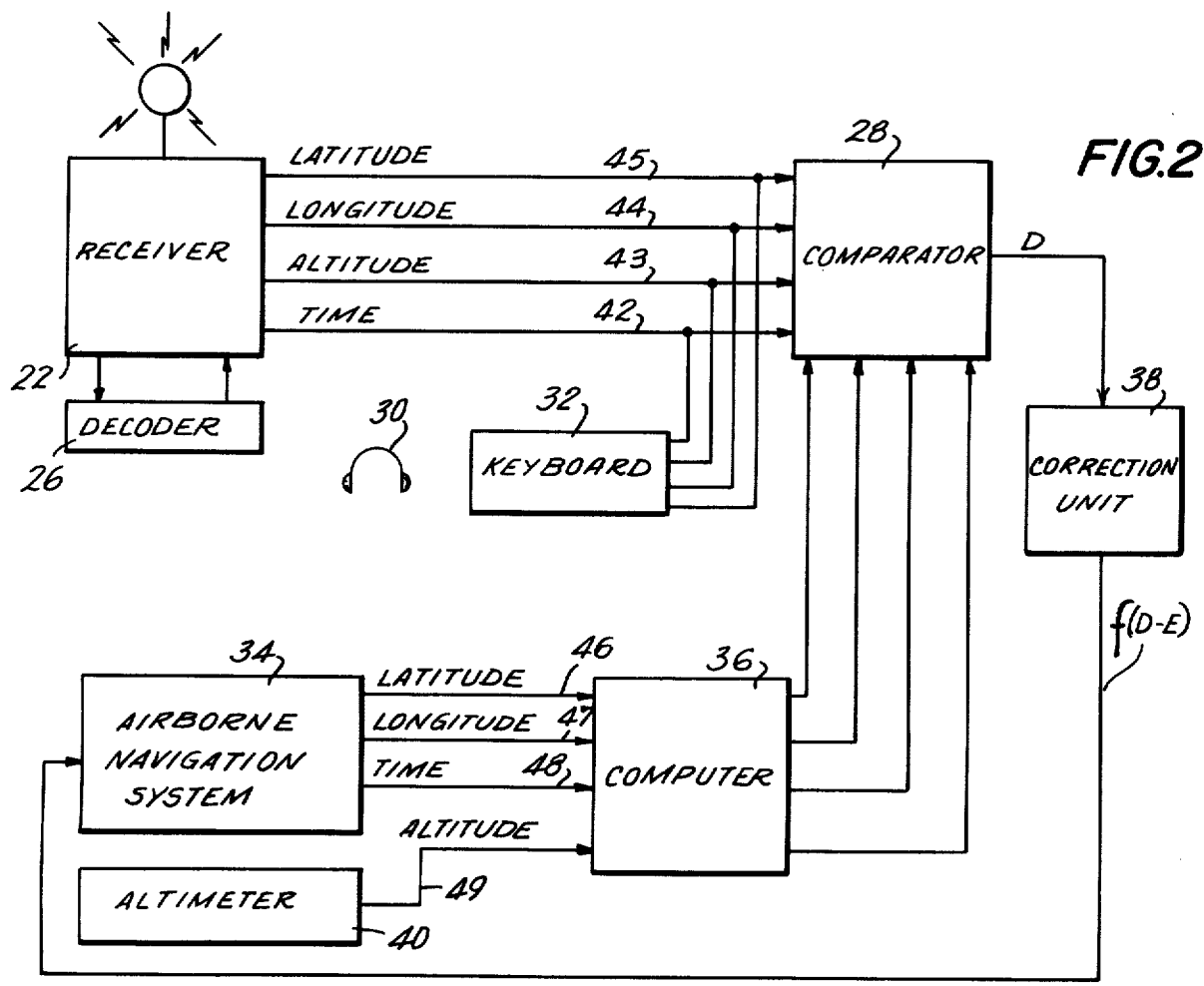
FIG. 2 is a schematic view of the arrangement in an individual aircraft for comparing the data communicated from the ground-based installation with the data derived from the airborne navigational system, to apply appropriate correction to the vehicle's position.

Ambiguity with respect to the results obtained from the comparator 28 and evaluation unit 38, may be reduced by supplying information on the altitude in conjunction with the positional data of latitude and longitude, for example. Thus, with multiple aircraft tracked by a ground radar installation 12, the ambiguity conditions described above, may be reduced significantly by taking into account the altitude associated with each set of positional data. When questionable results are obtained from the units 28 and 38, the navigator can possibly arrive at a decision on whether the results are useable, by taking into account the altitude associated with the data that is broadcast by the installation 12. Thus, if the navigator is uncertain whether a particular set of positional coordinates apply to him, and he finds that the altitude associated with the broadcast data is substantially remote from the altitude which he knows to prevail in conjunction with his own aircraft, then the navigator can simply reject or disregard that particular set of coordinates. For this purpose, the comparator unit 28 may also be fed with a parameter designating the altitude of his own aircraft, as derived from an altimeter 40. Accordingly, positional data transmitted by the ground installation involves not only the parameters of latitude and longitude, for example, but also the parameters of time and altitude in addition thereto. These parameters may be applied or transmitted by means of separate communication lines, or they may be transmitted over a single line in a coded manner which is conventional and well known in the art. For purposes of clarity and illustration, these parameters are shown in FIG. 2 as being transmitted over separate lines 42–45 from the receiver 22, and lines 46–49 from the unit 34, 40.

In accordance with the present invention, therefore, it is possible to correct an airborne navigational system by data obtained from a precision ground-based radar, without addressing each individual aircraft separately, provided that the error or uncertainty of the airborne navigational system is less than half the distance to the nearest aircraft. If the error of the airborne navigational system is greater than half the distance to the nearest aircraft, a navigator may mistakenly apply a correction using data which is, in fact, applicable to another aircraft. With such a large error in the airborne navigational system, therefore, the navigator cannot distinguish with any confidence, between his own position and the position of the nearest aircraft.

Whereas the comparison between the broadcast data and the data obtained from the airborne navigational computer, was illustrated as being performed automatically by the comparator unit 28, it is also quite possible to perform such comparison manually by the navigator, and thereby avoid the use of the required automatic equipment. Manual comparison may also be necessary in the event of breakdown or malfunctioning of the automatic system.

The use of the arrangement, in accordance with the present invention, described above, allows precision navigation for aircraft landings locating of airports, ground-controlled collision avoidance, and enroute navigation, as well as map display.

In accordance with another embodiment of the present invention, the ground radar installation 14 operates in conjunction with the computer 16 and a track predictor 15 used for predicting the position of each aircraft at a predetermined time interval in the future. Thus, the radar installation 14 provides the real-time position of each aircraft, and the computer 16 converts the coordinate information derived from the radar into X-Y coordinates or coordinates of longitude and latitude, for example. The respective coordinates of the instantaneous positions of each aircraft are then passed to the track predictor 15 which traces mathematically the path or trajectory of each aircraft over the time that real-time data is obtained from the radar installation. From this traced path of each aircraft, the track predictor extrapolates the trajectory of each aircraft over a predetermined time interval as, for example, five minutes. By such an extrapolation of the trajectory, the future position of each aircraft is, thereby estimated.

In conjunction with the track predictor 15, the computer 36 in the airborne vehicle stores in memory the aircrafts position, as estimated by the navigational system 34. The data is stored in the computer 36 for the same time interval corresponding to the interval of prediction carried out by the unit 15. Thus, the time interval for storing the position data by the computer 36 is to be commensurate with the time interval for prediction used by the unit 15, so as to result in a commensurate basis for comparing positions. The comparator 28 and correction unit 38 are then operated in the manner previously described for applying corrections to the airborne navigation system 34.

In applying corrections to the airborne navigation system 34, it is to be noted that the correction is a function of the parameters D-E, and this function $f$ (D-E) is operative in accordance with the rules described above in relation to FIG. 2.

The arrangement, in accordance with the present invention, when used in conjunction with a precision radar, can be used as a differential omega or differential loran navigational system to correct diurnal propagation errors in each line of position (LOP). Such operation removes a substantial source of error in these navigational aid systems.

Whereas the arrangement of the present invention was illustrated in conjunction with airborne vehicles, it is also feasible to use the arrangement of the present invention for ships at sea, for example.

Furthermore, the track predictor 15 may be directly a part of computer 16, or it may be a separate unit. The computational method of extrapolating trajectories is well known in the art and is, for this reason, not described here in further detail.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for determining the position of a predetermined vehicle in a group of vehicles comprising the steps of: measuring the position of said vehicle from aboard said vehicle; measuring the positions of all vehicles within said group from a predetermined reference position; transmitting from said reference position the measured positions of all vehicles to said group simultaneously; comparing in said predetermined vehicle all said measured positions with the position measured from said predetermined vehicle and deriving a comparison value; selecting the position associated with said vehicle from the transmitted positions of all vehicles of said group in dependence on predetermined selection rules; and applying a correction in the position of said predetermined vehicle dependent on said comparison value; said correction being applied when said comparison value is within predetermined limits related to the accuracy of measuring the position of said vehicle from aboard said vehicle, said correction being not applied when said comparison value is ambiguous by being less than a predetermined limit of said accuracy.

2. The method as defined in claim 1 including the step of transmitting from said reference position in coded form the measured positions of all vehicles to said group simultaneously, said correction in the position of said predetermined vehicle being applied when the accuracy of measuring the position of said vehicle from aboard said vehicle is less than half the distance to the nearest other vehicle in said group, said correction being applied when said comparison value is less for only one position than said accuracy of measuring the position of said vehicle from aboard said vehicle, said correction being applied dependent on the smallest comparison value when said comparison value is not less than said accuracy for only one position, said correction being not applied when said comparison value is less than said accuracy for several positions measured and transmitted from said reference position; transmitting the prevailing time in conjunction with each one of said measured positions; and transmitting the prevailing altitude in conjunction with each one of said measured positions.

3. The method as defined in claim 1 including the step of transmitting from said reference position in coded form the measured positions of all vehicles to said group simultaneously.

4. The method as defined in claim 1 wherein said correction in the position of said predetermined vehicle is applied when the accuracy of measuring the position of said vehicle from aboard said vehicles is less than half the distance to the nearest other vehicle in said group.

5. The method as defined in claim 1 wherein said correction is applied when said comparison value is less for only one position than said accuracy of measuring the position of said vehicle from aboard said vehicle.

6. The method as defined in claim 5 wherein said correction is applied dependent on the smallest comparison value, when said comparison value is not less than said accuracy for only one position.

7. The method as defined in claim 6 wherein said correction is not applied when said comparison value is less than said accuracy for several positions measured and transmitted from said reference position.

8. The method as defined in claim 1 including the step of transmitting the prevailing time in conjunction with each one of said measured positions.

9. The method as defined in claim 1 including the step of transmitting the prevailing altitude in conjunction with each one of said measured positions, said vehicles being airborne vehicles.

10. The method as defined in claim 1, including the step of predicting the positions of all vehicles at a predetermined instant in the future; storing in said predetermined vehicle the measured position corresponding to said instant in the future; and comparing the predicted positions with said stored position.

11. An arrangement for determining the position of a predetermined vehicle in a group of vehicles, comprising, in combination, first measuring means in said vehicle for measuring the position of said vehicle from aboard said vehicle; second measuring means at a predetermined reference position for measuring the positions of all vehicles within said group from said predetermined reference position; means for transmitting from said reference position the measured positions of all vehicles to said group simultaneously; means in each of said vehicles for receiving the measured positions transmitted from said reference position; comparison means in said vehicle for comparing all said measured positions transmitted from said reference position, with the position measured from said predetermined vehicle, the output of said comparison means comprising a comparison value; means for selecting the position associated with said vehicle from the transmitted positions of all vehicles of said group in dependence on predetermined selection rules; and correcting means for applying a correction in the position of said predetermined vehicle dependent on said comparison value; said correction being applied when said comparison value is within predetermined limits related to the accuracy of measuring the position of said vehicle from aboard said vehicle, said correction being not applied when said comparison value is ambiguous by being less than a predetermined limit of said accuracy.

12. The arrangement as defined in claim 11 including encoding means for transmitting said measured positions from said reference position in encoded form; and decoding means in said vehicle for decoding the encoded form received from said reference position.

13. The arrangement as defined in claim 11 wherein said accuracy of measuring the position of said vehicle from aboard said vehicle is less than half the distance to the nearest vehicle in said group.

14. The arrangement as defined claim 11 wherein said comparison value is less for only one position than said accuracy of measuring the position of said vehicle from aboard said vehicle.

15. The arrangement as defined in claim 14 wherein said correction is applied dependent on the smallest comparison value when said comparison value is greater than said accuracy for any position.

16. The arrangement as defined in claim 15 wherein said correction is inhibited from being applied when said comparison value is less than said accuracy for several positions.

17. The arrangement as defined in claim 11 including means for transmitting the prevailing time in conjunction with each one of the positions measured from said reference position.

18. The arrangement as defined in claim 11 including means for transmitting the prevailing altitude in conjunction with the measured positions transmitted from said reference position, said vehicles comprising airborne vehicles.

19. The arrangement as defined in claim 11 including means for converting the coordinates of the positions measured by at least one of said measuring means.

20. The arrangement as defined in claim 11 including information storage means connected to said comparator means for storing the positions from at least one of said measuring means.

21. The arrangement as defined in claim 11 including means for predicting the positions of all vehicles within said group at a predetermined instant of time in the future; and means for storing the position of said vehicle from aboard said vehicle until said instant of time in the future, said stored position being compared with said predicted positions.

22. The arrangement as defined in claim 11 including encoding means for transmitting said measured positions from said reference position in encoded form; decoding means in said vehicle for decoding the encoded form received from said reference position, said accuracy of measuring the position of said vehicle from aboard said vehicle being less than half the distance to the nearest vehicle in said group, said comparison value being less for only one position than said accuracy of measuring the position of said vehicle from aboard said vehicle, said correction being applied dependent on the smallest comparison value when said comparison value is greater than said accuracy for any position, said correction being inhibited from being applied when said comparison value is less than said accuracy for several positions; means for transmitting the prevailing time in conjunction with each one of the positions measured from said reference position; means for transmitting the prevailing altitude in conjunction with the measured positions transmitted from said reference position; means for converting the coordinates of the positions measured by at least one of said measuring means; information storage means connected to said comparator means for storing the positions from at least one of said measuring means; means for predicting the positions of all vehicles within said group at a predetermined instant of time in the future; and means for storing the position of said vehicle from aboard said vehicle until said instant of time in the future, said stored position being compared with said predicted positions.

* * * * *